Nov. 15, 1966  L. HOLLEMAN  3,284,906
MANUALLY OPERABLE APPARATUS FOR MEASURING, AND VISIBLY
INDICATING THE LENGTH OF A LONGITUDINAL MEMBER
Filed Dec. 30, 1963

INVENTOR.
LEENDERT HOLLEMAN

United States Patent Office 3,284,906
Patented Nov. 15, 1966

3,284,906
MANUALLY OPERABLE APPARATUS FOR MEASURING, AND VISIBLY INDICATING THE LENGTH OF A LONGITUDINAL MEMBER
Leendert Holleman, 4261 Long Beach Blvd., Long Beach, Calif.
Filed Dec. 30, 1963, Ser. No. 334,662
9 Claims. (Cl. 33—134)

Generally speaking, the present invention relates to measuring apparatus and, more particularly, to measuring apparatus of a very small lightweight readily portable type (although it can be mounted at a particular location and used, if desired) for measuring and visibly indicating the length of a longitudinal member, flexible or otherwise. The apparatus is such as to be capable of performing the length-measuring operation with respect to longitudinal members of various thicknesses and is particularly advantageous for measuring such longitudinal members which are normally coiled and which are rather difficult to measure in terms of the linear length thereof by conventional means. Furthermore, the portable feature of the present invention provides a highly advantageous arrangement making it possible to carry the measuring apparatus to a relatively large heavy coil of a longitudinal member which is to be measured, such as copper tubing, hose, electrical BX cable, or other equivalent longitudinal members, so that the measuring operation can be performed where the heavy coiled up longitudinal member is positioned. Furthermore, this makes it possible to merely unwind the end of the coiled up longitudinal member so that it can be passed through the portable measuring device of the present invention and it can be rewound or recoiled on the other side of the measuring device of the present invention, thus making it not necessary to ever unreel the entire longitudinal member into a straight relationship. This, plus the fact that the invention saves a great deal of trouble since it is not necessary to move the longitudinal member to a particular specified measuring region where a stationary measuring device is located, produces great time savings where many such measuring operations are performed such as in a warehouse, factory, store, or the like.

With the above points in mind, it is an object of the pesent invention to provide a novel apparatus for measuring, and visibly indicating, the length of a longitudinal member by being relatively moved along the length thereof which is to be measured, with a rotatably mounted measuring wheel means in engagement therewith and coupled to a counting, totalizing, and indicating means carried by the portable measuring apparatus so that a direct reading can be visibly taken of the length of the longitudinal member measured at any given point therealong. Furthermore, one improved form of the invention has the counting, totalizing, and indicating means so arranged as to indicate linear inches, linear feet, and linear 10-foot lengths, thus making it possible to very quickly and easily read off the total length of the longitudinal member which has been measured at any point therealong.

It is a further object of the present invention to provide a novel measuring apparatus of the character referred to above, provided with novel marking means for marking the longitudinal member at any desired measured length therealong.

It is a further object of the present invention to provide a novel measuring apparatus of the character referred to hereinbefore, which is of a small lightweight portable nature such as to make it possible to take the measuring apparatus to the longitudinal member which is to be measured rather than vice versa and which further makes it possible, if desired, to move the measuring apparatus along the length of the longitudinal member during the measuring operation rather than to move the longitudinal member through the measuring apparatus while the measuring apparatus remains stationary. However, it may be operated either way.

It is a further object of the present invention to provide a novel measuring apparatus of the character referred to above, which is capable of cooperation with various thicknesses of a longitudinal member to be measured and which, in order to facilitate this, is provided with a pivotally mounted opposition idler wheel or roller means positioned in spring-biased opposition to the measuring wheel means whereby to be capable of being spaced therefrom a variable distance corresponding to the thickness of the longitudinal member which is to be measured.

It is a further object of the present invention to provide novel measuring apparatus of the character referred to in the preceding object, wherein said opposition idler wheel or roller means is pivotally mounted by a support arm which is provided with a manually engageable operating handle means for controllably pivotally moving said opposition idler wheel or roller means away from the main measuring means when desired. This facilitates initial engagement of the apparatus with respect to a longitudinal member which is to be measured and also facilitates the later disengagement therefrom after completion of a measuring operation.

It is a further object of the present invention to provide apparatus of the character referred to hereinbefore embodying any or all of the features referred to hereinbefore, either generically or specifically, and either individually or in combination, and which is of relatively simple, inexpensive, lightweight, readily portable, foolproof, easy-to-use, and easy-to-manufacture construction such as to facilitate the widespread or mass manufacture, distribution, and use of the apparatus.

Further objects are implicit in the detailed description which follows hereinafter (which is to be construed as exemplary only, and not as specifically limiting the invention), and said object will be apparent to persons skilled in the art after a careful study of the detailed description which follows hereinafter.

For the purpose of clarifying the nature of the present invention, one exemplary embodiment of the invention is illustrated in the hereinbelow-described figures of the accompanying single drawing sheet and is described in detail hereinafter.

FIG. 1 is a three-dimensional pictorial view of one exemplary embodiment of the present invention showing it in a normal non-use relationship of the various elements thereof.

FIG. 2 is a fragmentary vertical sectional view, taken along the plane, and in the direction, indicated by the arrows 2—2 of FIG. 1, at a location behind the near wall of the housing of the device and behind the bearing support blocks for the lower horizontal shaft best shown in FIG. 3.

FIG. 3 is a cross-sectional view of the complete apparatus of FIG. 1 as it would appear when taken along the plane, and in the direction, indicated by the arrows 3—3 of FIG. 2.

FIG. 4 is an enlarged fragmentary sectional view of the complete apparatus of FIG. 1 as it would appear when taken along the plane, and in the direction, indicated by the arrows 4—4 of FIG. 2.

FIG. 5 is a greatly enlarged fragmentary view similar to that portion of FIG. 3 enclosed in the broken line circle of FIG. 3 and designated by the arrow 5, whereby to clearly show the detailed structure of the marking means.

FIG. 6 is a greatly reduced size elevational view of the apparatus as seen from a position on the near side of FIG. 1. However, this view shows the opposition idler wheel or roller means, in solid or full lines, in an actual measuring relationship with respect to a longitudinal member (shown fragmentarily) and shows, in broken lines, said idler wheel or roller means forcibly manually moved into a disengaged relationship with respect to said longitudinal member to allow the easy insertion of the end of said longitudinal member into the measuring relationship at the beginning of a measuring operation and also to allow the easy removal of the longitudinal member from the measuring apparatus at the end of a measuring operation.

Referring to the figures for exemplary purposes, one illustrative embodiment of the invention is shown as comprising a portable housing or base means, indicated generally at 11, which is provided with a projecting carrying handle means 12 at one end and which is also provided with a rotatably mounted measuring wheel means, indicated generally at 13.

In the example illustrated, said measuring wheel means 13 is rotatably mounted by a threaded screw 14 fastened to the outer end of a shaft 15 which extends through the front wall 16 of the housing 11 into a lower interior chamber 17 within said housing 11. The shaft 15 is normally provided with retention collar or ring means for restraining it from longitudinal movement once it is mounted in the desired relationship with respect to the housing front wall 16 and with respect to the two rotary bearing support blocks 18 carried in upstanding relationship by the bottom wall 19 of the housing 11.

The measuring wheel means 13 has an exterior measuring periphery 21 therearound which actually comprises an outwardly concave receiving rim which has at least a portion thereof projecting into a measuring position exterior of the housing base means 11 for rolling contact with a length of a longitudinal member which is to be measured, such as is shown in cross-section at 22 in FIG. 5 and such as is shown fragmentarily in side elevation at 22 in FIG. 6. In the exemplary form illustrated, said portion projecting into said measuring position is indicated by the reference numeral 23, which also designates said measuring position.

The housing and base means 11 is also provided with exteriorly visible counting, totalizing, and indicating means for indicating the length of rotary movement of said measuring wheel means 13 along said longitudinal member 22. In the exemplary form of the invention illustrated said exteriorily visible counting, totalizing, and indicating means is generally designated by the reference numerals 24 (best shown in FIG. 1) and effectively comprises the first, second, and third counting, totalizing, and indicating disks 24A, 24B, and 24C, coupled by coupling means, generally indicated at 25, with respect to the measuring wheel means 13 in a manner whereby to be in driven relationship with respect thereto.

It will be noted that, in the exemplary form illustrated, said first counting, totalizing, and indicating disk 24A is provided with linear inch measurement indicia means, such as indicated at 26A, that said second counting, totalizing, and indicating disk 24B is provided with linear foot measurement indicia means, such as indicated at 26B, and that said third counting, totalizing, and indicating disk 24C is provided with linear 10-foot length measuring indicia means, as indicated at 26C.

It will further be noted that, in the exemplary form of the invention illustrated, each of said three indicating disks 24A, 24B, and 24C, is rotatably carried above the top wall 27 of the housing 11 by a vertically downwardly directed shaft, as indicated at 28A, 28B, and 28C, respectively, with each of said shafts being adapted to be provided with suitable retention means for preventing relative longitudinal movement thereof after mounting with respect to the top wall 27 of the housing 11.

It will also be noted that, in the exemplary form of the invention illustrated, the hereinabove-mentioned coupling means 25 coupling the three counting, totalizing and indicating disks 24A, 24B, and 24C with respect to the measuring wheel means 13 comprises first gearing means 25A effectively connecting the measuring wheel means 13 with respect to said first indicating disk 24A in an input-to-output ratio, or transmission ratio, corresponding to the ratio of the number of revolutions of said measuring wheel 13 required to roll along a 12-inch length of the longitudinal member 22 relative to one revolution of said first indicating disk 24A which bears the linear inch indicia 26A indicating a measured length of 12 inches. Said first gearing means 25A comprises a first bevel gear 25A' rigidly carried by the inner end of the previously mentioned horizontal shaft 15, which carries the measuring wheel 13 at the opposite end thereof, and a second larger bevel gear 25A" which is rigidly carried at the bottom of the previously mentioned vertical shaft 28A, which carries the first indicating disk 24A at the top thereof.

Said coupling means 25 also comprises second gearing means 25B effectively connecting the vertical shaft 28A of the first indicating disk 24A with respect to said second indicating disk 24B in a 12-to-1 reduction ratio whereby to cause said second indicating disk 24B to rotate at $\frac{1}{12}$ the rate of said first indicating disk 24A. Said second gearing means 25B comprises a first small spur gear 25B' rigidly carried by the vertical shaft 28A and a second larger spur gear 25B" rigidly carried by the bottom of the shaft 28B which carries the second indicating disk 24B at the top thereof.

Said coupling means 25 also comprises a third gearing means 25C effectively connecting the vertical shaft 28B of the second indicating disk 24B with respect to said third indicating disk 24C in a 10-to-1 reduction ratio whereby to cause said third indicating disk 24C to rotate at $\frac{1}{10}$ the rate of said second indicating disk 24B. Said third gearing means 25C comprises a first small spur gear 25C' rigidly carried by the vertical shaft 28B and a second larger spur gear 25C" rigidly carried by the bottom of the shaft 28C which carries the third indicating disk 24C at the top thereof.

It should be noted that the bottom ends of the vertical shafts 28C and 28B and an intermediate portion of the vertical shaft 28A are rotatably carried in a longitudinal intermediate wall portion 29 which divides the interior of the housing or base means 11 into the previously mentioned lower chamber 17 and the upper chamber portion 31 which carries the second and third gearing means 25B and 25C therein.

The housing or base means 11 is provided with visibly observable pointer means 32A, 32B, and 32C, cooperable with the corresponding indicia means 26A, 26B, and 26C of the corresponding indicating disks 24A, 24B, and 24C, respectively.

It will be understood that the arrangement is such that rollable movement of the measuring wheel means 13 along the longitudinal member 22, which is to have its length measured, will cause differential rotation, in the above-indicated relationships or ratios, of the three indicating disks 24A, 24B, and 24C, whereby to provide a direct and visibly observable reading of the exact length of the longitudinal member 22 which has been measured at any point along the length thereof.

The above-described measuring opration is facilitated by reason of the fact that the exemplary form of the apparatus illustrated is provided with an opposition idler wheel means, indicated generally at 33, which is provided with an exterior contact periphery 34 therearound comprising an outwardly concave rim. Said idler wheel means 33 is rotatably mounted by suitable mounting screw or pivot pin means 35 at the forward end of a support arm, indicated generally at 36, which is pivotally mounted by effective pivot pin or screw means 37 with respect to a rear portion of the side wall 16 of the housing 11 for pivotal movement between the normal closed relationship shown in solid lines in FIGS. 1, 3, and 6, and the forcibly manually caused open relationship shown in broken lines in FIG. 6.

Moving the idler wheel means 33 into the open or disengaged position shown in broken lines in FIG. 6 is facilitated by reason of the fact that the support arm 36, in the exemplary form of the invention illustrated, is provided with rearwardly and slightly downwardly projecting manually engageable operating handle means 38 which can be manually grasped by the fingers of a user of the measuring apparatus when the remainder of his hand is holding the apparatus by means of the previously mentioned carrying handle 12. Then, by merely closing his hand so as to pull his fingers upwardly, the support arm 36 can be pivotally moved into the broken line relationship shown in FIG. 6, which completely disengages the idler wheel means 33, against the action of the biasing spring means 39, from its normal closed vertical opposition to the bottom edge of the exterior contact periphery 21 of the measuring wheel means 13 so that the longitudinal member 22 can be easily engaged with respect to the measuring apparatus prior to a measuring operation or can be disengaged with respect thereto after completion of a measuring operation.

Certain forms of the invention may be provided with novel marking means, normally in an inoperative relationship, but controllably operable for movement from said inoperative relationship into an operative relationship for marking contact with a longitudinal member, such as the one shown fragmentarily at 22 whereby to mark or indicate the end point of a measured length thereof. This can be a beginning end point at the beginning of a measuring operation, and end point at the completion of a measuring operation, or both, as desired.

In the exemplary form of the invention illustrated, the above-described marking means takes one exemplary form, as indicated generally at 41, wherein it comprises an inwardly and laterally directed pointed and/or sharpened scribing or cutting element 42 provided with, and carried at the bottom free end 43 of a resilient mounting arm 44, which has its upper or opposite end fastened as indicated at 45 to the side wall 16 of the housing 11 in a relationship such that the scribing or cutting element 42 is normally spaced outwardly from the measuring wheel means 13 in the manner most clearly shown in solid lines in FIG. 5. However, the measuring wheel means 13 is provided with a plurality of laterally directed entry apertures, such as indicated at 46, at a plurality of circularly spaced locations therearound and each substantially aligned with an inner edge of the measuring or contact periphery 21 of the measuring wheel means 13 whereby to be positioned for the reception of said scribing or cutting element 42, when in aligned relationship with respect thereto, so that said scribing or cutting element 42, when forcibly moved inwardly, will very slightly scribe, cut or nick the inner edge of the longitudinal member 22 at a location such as is indicated at 47 in FIG. 5. This will effectively mark the longitudinal member 22 in a perceptible manner at a desired end point.

While the above describes one particularly convenient and advantageous type of marking means 41, it should be noted that the marking means may be modified within the broad scope and teachings of the present invention.

It should be noted that upon completion of a length-measuring operation the three indicating disks 24A, 24B, and 24C can be reset or returned to the initial or zero position shown in FIG. 1 by manually rotating the indicating disk 24C in the reverse direction back to the zero position shown in FIG. 1. This will also return each of the other two indicating disks 24B and 24A to their zero positions. However, it should be noted that, if desired, various other "clearing" or reset means may be employed for performing this operation. For example, torsion spring means and stop means normally adapted to maintain each of said three indicating disks in said zero position may be coupled thereto so that upon disengagement of the measuring wheel means 13 from the longitudinal member 22, said spring means will automatically return all of said three indicating disks to the zero position as determined by a stop member. Also, if desired, small resetting electric motor means may be similarly coupled with respect to the indicating disks, in lieu of such a torsion spring means, and may be arranged to be controllably energized after completion of a measuring operation by merely pressing an energizing switch so as to cause the automatic resetting of all of the three indicating disks to their zero positions. Such a small electric motor may be provided with either a self-contained power supply, such as a battery or the like carried by the portable measuring apparatus, or may be adapted to be connected to an exterior source of electric power by an extension cord or the like. Also, various other types of reset means may be employed within the broad scope of the present invention.

The housing means of the present invention, the measuring and idler wheel means, and the indicating disks, may be made of molded plastic material or of any other suitable material. The coupling means may be made of metal, or in certain forms of the invention, may be made of suitable high-strength plastic material and, in some forms of the invention, this may be particularly advantageous because the plastic material may be of a type which does not require lubrication, such as "nylon" or "Teflon" or various other functional equivalents. The marking means, spring means, and the supporting arm may be made of metal or of any other suitable material.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Portable manually operable apparatus for measuring, and visibly indicating the length of a longitudinal member, comprising: portable base means provided with rotatably mounted measuring wheel means having an exterior measuring periphery therearound with at least a portion thereof projecting into a measuring position for rolling contact with a length of a longitudinal member which is to be measured, and marking means positioned adjacent to the measuring periphery of said measuring wheel means in a normally inoperative relationship with respect to said measuring wheel means and the longitudinal member adapted to be measured thereby but controllably operable for movement from said inoperative position into an operative position in marking contact with said longitudinal member to indicate an end point thereof, said marking means comprising a laterally directed cutting element provided with, and carried by, resilient mounting means connected to said base means, said measuring wheel means being provided with a plurality of laterally directed entry apertures, each at a different location substantially aligned with an inner edge of the measuring periphery of said measuring wheel and positioned for the reception of said cutting element in a position such as to very slightly cut the inner edge of a measured longitudinal member adapted to be engaged by said measuring periphery of said measuring wheel means, said base means being provided with exteriorly visible counting, totalizing, and indicating means for indicating the length of rotary movement of said measuring wheel means along said longitudinal member, said counting, totalizing, and indicating means including coupling means carried by said base means and effectively connected with respect to said measuring wheel means in driven relationship relative thereto.

2. Measuring apparatus as defined in claim 1, including an opposition idler wheel means having an exterior contact periphery therearound provided with, and rotatably mounted on, support means positioned opposite the portion of said measuring wheel means adapted to engage said longitudinal member which is to be measured whereby opposed portions of said peripheries of said measuring wheel means and said idler wheel means will receive a portion of said longitudinal member therebetween as they are rollably moved along the length thereof which is to be measured.

3. Measuring apparatus as defined in claim 1, including an opposition idler wheel means having an exterior contact periphery therearound provided with, and rotatably mounted on, support means positioned opposite the portion of said measuring wheel means adapted to engage said longitudinal member which is to be measured whereby opposed portions of said peripheries of said measuring wheel means and said idler wheel means will receive a portion of said longitudinal member therebetween as they are rollably moved along the length thereof which is to be measured, said support means being pivotally mounted with respect to said base means at a point displaced from said idler wheel means and being provided on the opposite side of said pivotal mounting thereof with projecting manually engageable operating handle means for pivotally moving said idler wheel means away from said measuring wheel means for facilitating engagement and disengagement thereof with respect to a longitudinal member before and after measuring the length thereof.

4. Measuring apparatus as defined in claim 1, including an opposition idler wheel means having an exterior contact periphery therearound provided with, and rotatably mounted on, support means positioned opposite the portion of said measuring wheel means adapted to engage said longitudinal member which is to be measured whereby opposed portions of said peripheries of said measuring wheel means and said idler wheel means will receive a portion of said longitudinal member therebetween as they are rollably moved along the length thereof which is to be measured, said support means being pivotally mounted with respect to said base means at a point displaced from said idler wheel means and being provided on the opposite side of said pivotal mounting thereof with projecting manually engageable operating handle means for pivotally moving said idler wheel means away from said measuring wheel means for facilitating engagement and disengagement thereof with respect to a longitudinal member before and after measuring the length thereof; and biasing spring means effectively connected between said base means and said support means and normally biasing said idler wheel means toward said measuring wheel means.

5. Measuring apparatus as defined in claim 1, including an opposition idler wheel means having an exterior contact periphery therearound provided with, and rotatably mounted on, support means positioned opposite the portion of said measuring wheel means adapted to engage said longitudinal member which is to be measured whereby opposed portions of said peripheries of said measuring wheel means and said idler wheel means will receive a portion of said longitudinal member therebetween as they are rollably moved along the length thereof which is to be measured, said support means being pivotally mounted with respect to said base means at a point displaced from said idler wheel means and being provided on the opposite side of said pivotal mounting thereof with projecting manually engageable operating handle means for pivotally moving said idler wheel means away from said measuring wheel means for facilitating engagement and disengagement thereof with respect to a longitudinal member before and after measuring the length thereof; and biasing spring means effectively connected between said base means and said support means and normally biasing said idler wheel means toward said measuring wheel means, said base means being provided with projecting carrying handle means positioned adjacent to, but displaced from, said operating handle means of said support means by a predetermined distance such as to facilitate manually grasping both of said handle means in one hand.

6. Measuring apparatus as defined in claim 1, wherein said counting, totalizing, and indicating means includes a first counting, totalizing and retaining disk provided with linear inch measurement indicia means rotatably carried in an exteriorly visible position by said base means.

7. Measuring apparatus as defined in claim 1, wherein said counting, totalizing, and indicating means includes a first counting, totalizing and retaining disk provided with linear inch measurement indicia means rotatably carried in an exteriorly visible position by said base means, said counting, totalizing and indicating means including a second counting, totalizing and indicating disk provided with linear foot measurement indicia means rotatably carried in an exteriorly visible position by said base means.

8. Measuring apparatus as defined in claim 1, wherein said counting, totalizing and indicating means includes a first counting, totalizing and retaining disk provided with linear inch measurement indicia means rotatably carried in an exteriorly visible position by said base means, said counting, totalizing and indicating means including a second counting, totalizing and indicating disk provided with linear foot measurement indicia means rotatably carried in an exteriorly visible position by said base means, said counting, totalizing and indicating means including a third counting, totalizing and indicating disk provided with linear 10-foot unit length indica means rotatably carried in an exteriorly visible position by said base means.

9. Measuring apparatus as defined in claim 1, wherein said counting, totalizing and indicating means includes a first counting, totalizing and retaining disk provided with linear inch measurement indicia means rotatably carried in an exteriorly visible position by said base means, said counting, totalizing and indicating means including a second counting, totalizing and indicating disk provided with linear foot measurement indicia means rotatably carried in an exteriorly visible position by said base means, said counting, totalizing and indicating means including a third counting, totalizing and indicating disk provided with linear 10-foot unit length indicia means rotatably carried in an exteriorly visible position by said base means, said coupling means including first gearing means effectively connecting said measuring wheel means with respect to said first counting, totalizing and indicating disk in an input-to-output ratio corresponding to the ratio of the number of revolutions of said measuring wheel required to roll along a 12-inch length relative to one revolution of said first counting, totalizing and indicating disk and the linear inch indicia thereof indicating a measured length of 12 inches, said coupling means including second reduction gearing means effectively connecting said first and second counting, totalizing and indicating disks in a 12-to-1 reduction ratio whereby to cause said second counting, totalizing and indicating disk to rotate at $\frac{1}{12}$ the rate of said first counting, totalizing and indicating disk, said coupling means including third reduction gearing means effectively connecting said second and third counting, totalizing and indicating disks in a 10-to-1 reduction ratio whereby to cause said third counting, totalizing and indicating disk to rotate at $\frac{1}{10}$ the rate of said second counting, totalizing and indicating disk;

and including suitable visibly observable pointer means cooperable with the indicia means of each of said three counting, totalizing and indicating disks.

References Cited by the Examiner

UNITED STATES PATENTS

| | | | |
|---|---|---|---|
| 916,148 | 3/1909 | Halley | 33—129 |
| 1,225,223 | 5/1917 | Davis | 33—129 |
| 1,646,275 | 10/1927 | Cronk | 33—129 X |
| 2,233,530 | 3/1941 | Holman | 33—134 |

FOREIGN PATENTS 83,906  5/1921  Austria.

LEONARD FORMAN, *Primary Examiner.*

H. N. HAROIAN, *Assistant Examiner.*